United States Patent [19]
Bersten

[11] Patent Number: 5,185,171
[45] Date of Patent: Feb. 9, 1993

[54] APPARATUS AND METHOD FOR ROASTING FOOD PRODUCTS

[76] Inventor: Ian J. Bersten, 105 Roseville Avenue, Roseville, New South Wales, 2069, Australia

[21] Appl. No.: 688,630
[22] PCT Filed: Dec. 14, 1989
[86] PCT No.: PCT/AU89/00536
§ 371 Date: Jun. 12, 1991
§ 102(e) Date: Jun. 12, 1991
[87] PCT Pub. No.: WO90/06694
PCT Pub. Date: Jun. 28, 1990

[30] Foreign Application Priority Data

Dec. 22, 1988 [AU] Australia ............... PJ2078

[51] Int. Cl.⁵ ............... A23F 5/00; A23N 12/00
[52] U.S. Cl. ............... 426/467; 34/10; 34/57 R; 99/286; 99/474; 426/466
[58] Field of Search ............ 426/466, 467; 99/286, 99/474; 34/10, 11, 57 R, 181

[56] References Cited

U.S. PATENT DOCUMENTS 2,859,116 11/1958 Heimbs et al. ............ 426/467
3,328,172 6/1967 Smith ............ 426/467
3,724,090 4/1973 Smith, Jr. ............ 34/57 D
4,325,191 4/1982 Kumagai et al. ............ 99/286

FOREIGN PATENT DOCUMENTS 472391 2/1929 Fed. Rep. of Germany .
1473109 3/1967 France .
2408802 6/1979 France .
1048817 11/1966 United Kingdom .

Primary Examiner—George Yeung
Attorney, Agent, or Firm—Hamilton, Brook, Smith & Reynolds

[57] ABSTRACT

A roaster for coffee beans or the like admits the beans into a roasting air stream (31, 23, 32) at an air stream entrance (24). The air stream transports the beans from entrance (24) in an air stream path (26, 36) to an altitude (36) from where they are directed to return to entrance (24) by falling into a hopper having side wall (13, 14) and a constriction (22) which controls the rate of admission of the beans into the air stream. In preferred embodiments the beans are admitted into a horizontal air stream with a component of velocity in the air flow direction and roasting air is also admitted to the hopper directly (46) or indirectly (44, 45) via wall perforations (19, 20).

30 Claims, 3 Drawing Sheets ically takes 5-30 minutes. For approximately two-thirds of this period the charge heats up uniformly and most of the moisture is lost. During the last five minutes or less the temperature of the coffee causes a rapid change of colour. Drum roasting of beans has several disadvantages including slowness, the buffeting of the beans against the sides of the drum or drum baffles with consequent risk of damage to beans and loss of aroma, and the fact that any machine incorporating rotating parts is susceptible to wear and breakdown. In addition, husks detach and burn within the drum causing flavour change.
APPARATUS AND METHOD FOR ROASTING FOOD PRODUCTS

FIELD OF THE INVENTION

The present invention relates to roasters for particulate food matter, and in particular to a roaster for coffee beans, nuts, or the like.

BACKGROUND OF THE INVENTION

In the past, particulate food matter which is suitable for roasting, for example coffee beans, has traditionally been placed within a rotating drum which is heated and/or has hot air blown through it. The process usu- On a larger scale, coffee beans have been roasted in a fluidized bed roaster in which hot air is admitted to a fluidizing chamber The air enters the fluidizing chamber in a vertical direction and fluidizes a bed of beans within the chamber. The beans remain suspended in hot air in the chamber or may be circulated in a vortex in the chamber until fully roasted. A substantial vertical air flow is required to maintain the fluidized bed in suspension and the whole of the fluidizing air has to be heated to a roasting temperature (typically 250° C. to 300° C.) which results in energy wastage or expensive heat recovery apparatus. Moreover it is difficult to establish and maintain a fluidized bed and the flow conditions required are critical and vary with bean blend and size. Furthermore, bean density varies during roasting as beans lose moisture and swell and air loses its potency as it heats up. These factors further complicate control of a fluidized bed. Fluidized bed roasters have been used for production rates of upwards of 5 Kgs. per hour and while mechanically simpler and quicker than drum roasters are more costly to manufacture and more difficult and costly to operate.

It is an object of the present invention to provide a roaster which ameliorates at least some the disadvantages of prior art. An object of preferred embodiments of the present invention is to provide a roaster which is mechanically simple, and is of less complicated construction and operation than a fluidized bed roaster. A further object of preferred embodiments of the invention is to provide a roaster suitable for use at a point of sale of roasted beans. Such a roaster would be capable of roasting quantities as small as half to one kilogram and be capable of operation by an unskilled operator.

DISCLOSURE OF THE INVENTION

According to a first aspect, the invention consists in a method for roasting a particulate food matter, said method comprising the steps of:

a) admitting the food matter particles into a roasting air stream at an air stream entrance;

b) directing the air stream with the admitted particles in a generally curvilinear path to an altitude above that of the entrance and then allowing the particles to return to the entrance; and c) controlling, by means of a constriction, the rate of admission of particles into the air stream.

In preferred embodiments the air flow adjacent the entrance is in a substantially horizontal direction and the particles of food matter, for example coffee beans, enter the air stream at an angle of not greater than 90°. For preference, the particles enter the air stream from a hopper having a constricted throat and at an angle of 45° or less to the air flow so that the beans have a component of velocity in the air flow direction. The rate of admission of the beans into the air flow is controlled by the constriction in relation to the air flow rate so that beans are enveloped and transported by the air away from the entrance without accumulating in the air flow at the entrance.

The term "horizontal" in this specification is used broadly to indicate a direction more nearly horizontal than vertical.

According to another aspect the present invention consists in roasting apparatus for particulate food matter comprising:

a hopper adapted to receive the particulate food matter and having an inlet and an outlet of smaller cross section than the inlet;

a curvilinear duct adapted to receive said food matter from the hopper outlet and communicating with the hopper inlet; and means for directing a stream of roasting air into the duct so as to transport the food matter through the duct from the hopper outlet to the hopper inlet.

The hopper walls may be straight sided or curve sided.

In use of the apparatus for roasting coffee beans, the beans are heated as they are cycled from the bottom of the hopper externally to the hopper and deposited back at the top. Continuous movement of the beans in this manner ensures uniform roasting without requiring the high air velocities needed to maintain a fluidized bed. In preferred embodiments the beans are also heated as they gravitate through in the hopper by means of hot air admitted through wall perforations and/or directly into the hopper chamber. For preference uniformity of roasting is enhanced by distributing beans entering the hopper over an area of the hopper inlet, the hopper inlet being of greater area than the hopper outlet.

BRIEF DESCRIPTION OF THE DRAWINGS

Preferred embodiments of the present invention will now be described, by way of example only, with reference to the accompanying drawings in which.

DESCRIPTION OF PREFERRED EMBODIMENT

Figure 1:
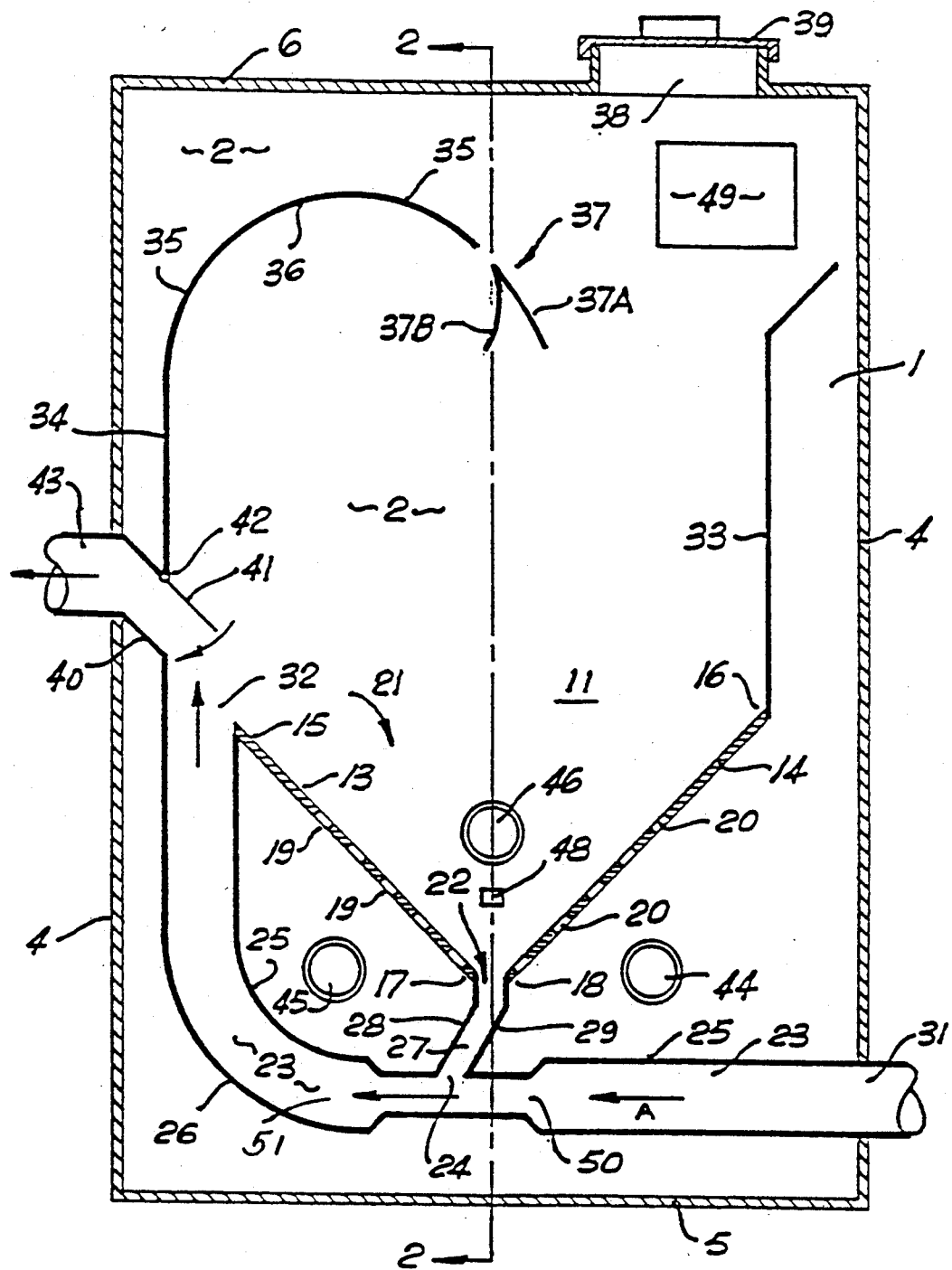
FIG. 1 is a schematic representation of a first embodiment of roasting apparatus according to the present invention shown in elevation.

In FIG. 1 there is shown a roasting apparatus comprising a chamber 1 defined by a back plate 2, a front plate 3, side w⁻¹ls 4, base wall 5 and roof wall 6. Within chamber 1 there is formed a hopper 11 defined between side plates 13, 14 disposed in a "V" shaped arrangement between back plate 2 and front plate 3. Hopper side plates 13, 14 are mounted to back plate 2 and extend to front plate 3. Side plates 13 and 14 have upper edges 15 and 16 and lower edges 17 and 18 respectively. In preferred embodiments, side plates 13, 14 have perforations 19, 20 in an area extending at least for a distance from lower edges 17, 18. The plate upper edges 15 and 16 define a hopper mouth or hopper inlet 21, and plate lower edges 17 and 18 are spaced apart to define a hopper outlet 22 which is of constricted cross sectional area in comparision with the hopper mouth. Hopper outlet 22 communicates via throat 27 with a duct 23 via duct entrance 24. Duct 23 is defined by inner duct wall 25 and outer duct wall 26 together with front and rear plates 2, 3. Throat 27 is formed by parallel spaced apart walls 28, 29 depending downwards from plate lower edges 17, 18 respectively.

A hot air source 30 upsteam of entrance 24 provides a stream of roasting air via feed pipe 31 into duct 23 in the direction indicated by arrow A. Duct 23 downstream of throat 27 and of duct entrance 24 is curvilinear and extends via a smooth curve from a substantially horizontal direction in the vicinity of duct entrance 24 to a substantially vertical direction. Duct 23 has a duct exit 32 adjacent edge 15 of hopper inlet 21.

Plate 14 is provided with an upward extending wall 33 at upper edge 16. The outer duct wall 26 is provided with a continuation wall 34 extending beyond exit 32 which blends into a curvilinear hood 35 extending to a zenith 36 and then downwardly towards a baffle 37. Duct 23 together with wall 34 and hood 35 together define a path or track which extends through an angle of 180° or more with respect to the air flow direction indicated by arrow A at below entrance 24.

In use, hot air source 30 blows a roasting air stream via feed pipe 31 into the curvilinear duct 23 in the horizontal direction of arrow A Duct entrance 24 is located downstream of hot air source 30 and the lower portion of throat 27 is disposed so as to feed coffee beans at an acute angle B to air feed pipe 31. This minimizes air flow into throat 27 and feeds beans into the air flow with a component of velocity in the air flow direction. Desirably feed pipe 31, hopper outlet 22 and duct 23 form a sealed environment to reduce hot air losses.

Particulate food matter such as coffee beans or nuts are fed into hopper 11 by conventional means for example at a bean port 38 provided with lid 39. The beans descend through hopper mouth 21, hopper outlet 22, via throat 27 and duct entrance 24 into duct 23. A roasting air flow (at for example 260° C. to 270° C. and 100 cfm for a 1500 gram charge of coffee beans) flowing from feed pipe 31 through duct 23 in the direction indicated by arrow A transports beans in the air flow. Hopper outlet 22 and/or throat 27 constrict the flow of beans into duct 23. The cross section of the constriction is selected with regard to the air flow from source 30 so that the air flow carries beans away from entrance 24 as rapidly as they can pass through the constriction and into the duct and avoids accumulation of beans in the duct below the throat. Because the beans enter the air flow with a component of velocity in the direction of air flow, the beans are enveloped and swept along with the air stream with a minimum of damage. The beans are transported along curvilinear duct 23 to duct exit 32 where they are either redirected into hopper 11 if only partly roasted, or if the roasting process is complete are directed out through a valve indicated generally at 40. Valve 40 can be manually or automatically operated. In the illustrated embodiment valve 40 is positioned in continuation wall 34 forming a part of duct 23 beyond duct exit 32. Valve 40 includes a plate 41 which in its normal position forms a part of outer duct wall 26 or of continuation wall 34, but which in a "roaster exit" position pivots inwardly about pivot 42 to deflect the roasted beans out through an opening 43 uncovered by the pivoting plate 41 to exit from the roaster. After passing through opening 43 the roasted beans are collected in a receptacle (not shown) either directly or after further deflection or guidance.

When valve 40 is in its normal position the air stream emanating from duct 23 at duct exit 32 containing partly roasted beans is guided by continuation wall 34 and deflecting hood 35, being a continuation of duct wall 26, and the beans are thereby directed towards hopper inlet 21 together with hot air used in their transport. A baffle 37 of generally inverted "V" shaped appearance when viewed as in FIG. 1 is located below deflecting hood 35. As viewed in FIG. 2, one arm 37A of the baffle extends from wall 2 to midway between walls 2 and 3. The other arm 37B extends from wall 3 to midway between walls 2, 3. Baffle arm 37A directs approximately half the partly roasted beans with a low velocity towards hopper side 14 and baffle 37B directs the remainder in a curve towards hopper side 13. The beans are thus evenly distributed in the hopper. Hot air from duct 23 is also thus directed by hood 35 downwardly at the beans in hopper 11. Arms 37A and 37B are in practice desirably shaped to provide a smooth deflection of air and coffee beans towards one or other hopper side.

It will be appreciated that as the coffee beans are continually enveloped in the hot air stream, and rarely impinge on the sides of the duct or hopper, damage to the beans is minimized. Furthermore, as the fluid stream and beans are continually being directed in a path through hopper 11, along duct 23, deflecting hood 35 and being returned to hopper 11 the control of the fluid flow is not critical, in comparison with a fluidized bed roaster. A much lower air flow is required since the air merely has to transport the beans and is not required to fluidize a bed. Furthermore, as the beans have an initial velocity in the direction of transport static forces do not need to be overcome nor are the beans equipped to reverse direction. The transport of the beans ensures that they are uniformly exposed to hot air and prevents hot spots from developing. The extended path length of the beans in hot air provided by duct 23 gives a longer opportunity for heat exchange than does a vertical air flow through a stationary or fluidized bed.

Figure 2:
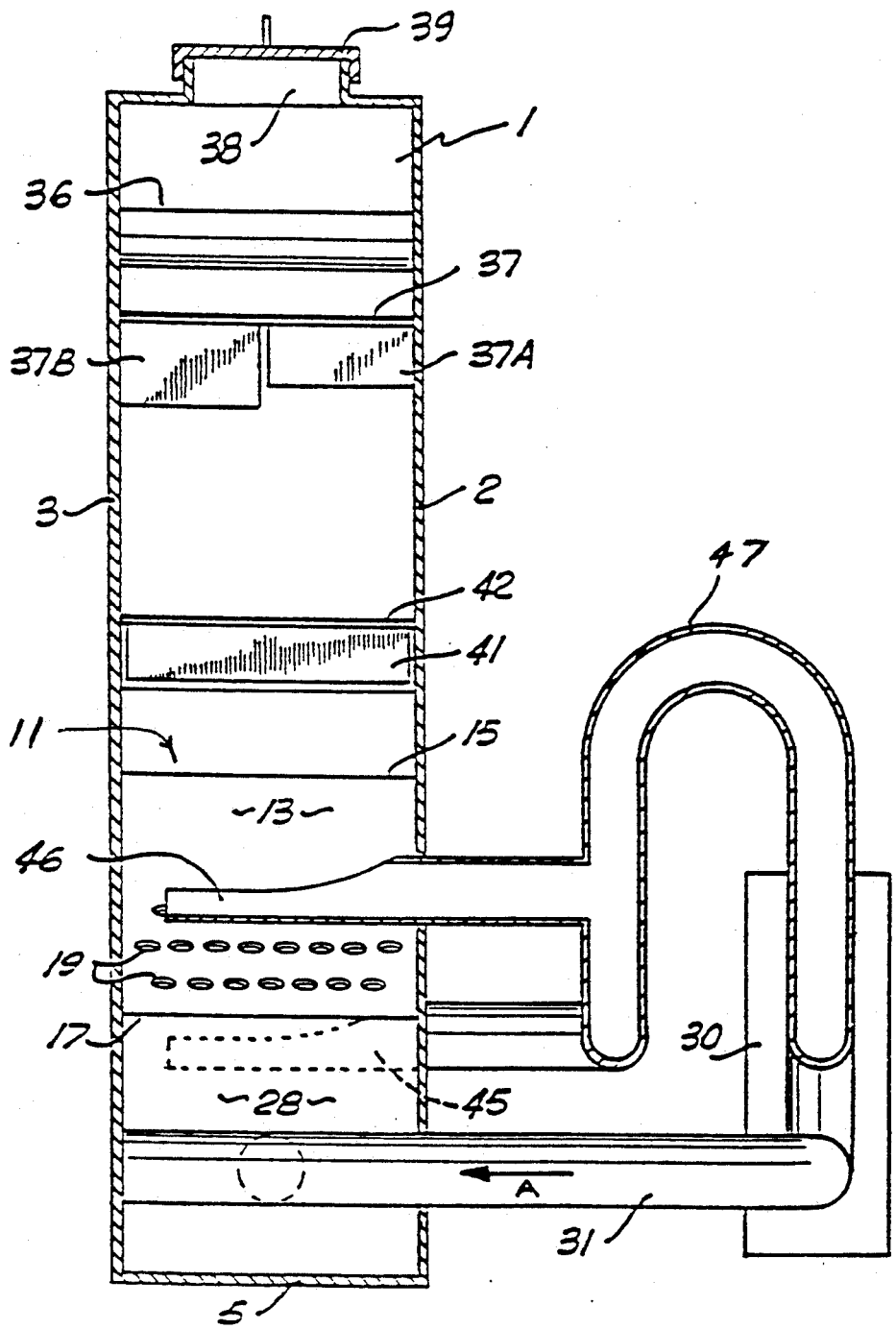
FIG. 2 is a section taken through line 2—2 of the embodiment of FIG. 1.

Auxiliary air outlets 44 and 45, best seen in FIG. 2, are desirably located below the side plates 13, 14 of hopper 11 adjacent perforations 20, 21. The beans within the hopper 11 being either partly roasted or not are thus also subject to hot air flow before entering throat 27 and while resident in hopper 11. A further auxiliary outlet 46 is located intermediate hopper inlet 21 and outlet 22 so as also to subject the beans entering hopper 11 to the hot air stream. Outlets 44, 45, 46 and 31 are connected to the hot air source 30 through manifold 47. This arrangement permits the temperature of beans in hopper 11 to be controlled to an extent independently of the speed of transport of the beans in duct 23. The beans desirably have a long residence time in the hopper in comparison with residence time in duct 23, the transport through the duct re-orienting the beans for even roasting. Valve means (not illustrated) may be provided on manifold 47 to control hot air supply at outlets 44, 45, 46. In Preferred embodiments the air flow from air outlets 44 and 45 is confined and directed to perforations 19 and 20 by manifolds (not illustrated) or other means to avoid air losses. The air flow through the perforations assists in reducing friction between the beans and the hopper walls as well as providing heat and permits low angles of entry to the air stream to be achieved. One or more thermocouples 48 may be located in the roaster for example near hopper outlet 22 to assist in controlling bean temperature and in determining when the beans are roasted.

Any husks or residue matter from the beans is taken away with the exhaust gas through a spent air outlet 49 to a conventional cyclone and/or filter.

If desired, a sliding valve may be inserted at hopper outlet 22 to retain beans in the hopper. However, a machine designed for a capacity for example of one kilogram may be operated by commencing the hot air flow, admitting a batch of coffee beans at bean inlet port 38, replacing lid 39, allowing the beans to circulate from and to the hopper until roasted and then pivoting valve plate 41 so as to direct roasted beans out of the roaster at 43. With suitable hot air a kilogram of coffee beans may be roasted in from 5 to 7 minutes in the embodiment described.

The construction of the roasting apparatus is extremely simple and except for the valve or valves involves no moving parts. For preference, the use of valves and especially of critical high temperature air control valves is minimized. In the preferred embodiment illustrated the apparatus is contained between two plates 2, 3 of which one is removable to give access to the chamber interior thereby simplifying manufacture, cleaning and maintenance. Preferably front sheet 3 is of glass or other suitable transparent heat resistent material so that the process can be watched when operated in situations such as at a retail store and to assist an operator in determining when the roasting process is complete. The operating conditions are relatively non-critical and the apparatus is readily controlled by unskilled operators.

In the embodiment illustrated duct 23 is of rectalinear cross-section defined between curvilinear walls 25, 26 and sheets 2, 3 but in other embodiments a tube of circular cross section can be used to form all or part of duct 23, air pipe 31 and throat 27 and in that case conventional pipe fittings may be employed.

In a preferred embodiment of the invention the arrangement of ducts in the vicinity of duct opening 24 provides a venturi effect which assists in drawing solids from the hopper throat 27 into duct 23. For example hot air feed pipe 31 may be a pipe of 2" diameter reducing at 50 upstream of entrance 24 to 1½" diameter and enlarging at 51 downstream of entrance 24 to a 2" in diameter duct 23. Throat 27 is also 1"½" diameter.

Advantageously the apparatus may be of approximately 500 mm width, 300 mm depth and 600 mm height. As such it utilizes a small space for its output in comparison with other roasters and requires auxiliary air pumps and heaters of much smaller capacity than fluidized bed machines. In the example described the apparatus is driven by a simple 14 KW heater and blower.

Although side plates 13, 14 are of flat plate in the illustrated embodiment, in a preferred embodiment each of plates 13, 14 is a channel of curved cross section when viewed towards the top edge and each extends downwardly towards throat 27 thereby directing solids towards the throat. Either or both of plates 13, 14 may curve from the upper edges 15, 16 to lower edges 17, 18 respectively.

The path of duct 23 from and to the hopper may be varied but it is desirable to minimize impingement of beans against walls or baffles. The track path length is desirably selected to provide a satisfactory residence period in the air stream having regard to the hot air source used. Auxiliary air inlets may be located otherwise than as illustrated.

If desired the contents of the hopper can be heated by means other than hot air, for example by electric heating elements associated with the hopper walls.

It is envisaged that elements which are common to the trade such as thermocouples, blowers and cyclones can be readily incorporated in appropriate positions of the apparatus.

Figure 3:
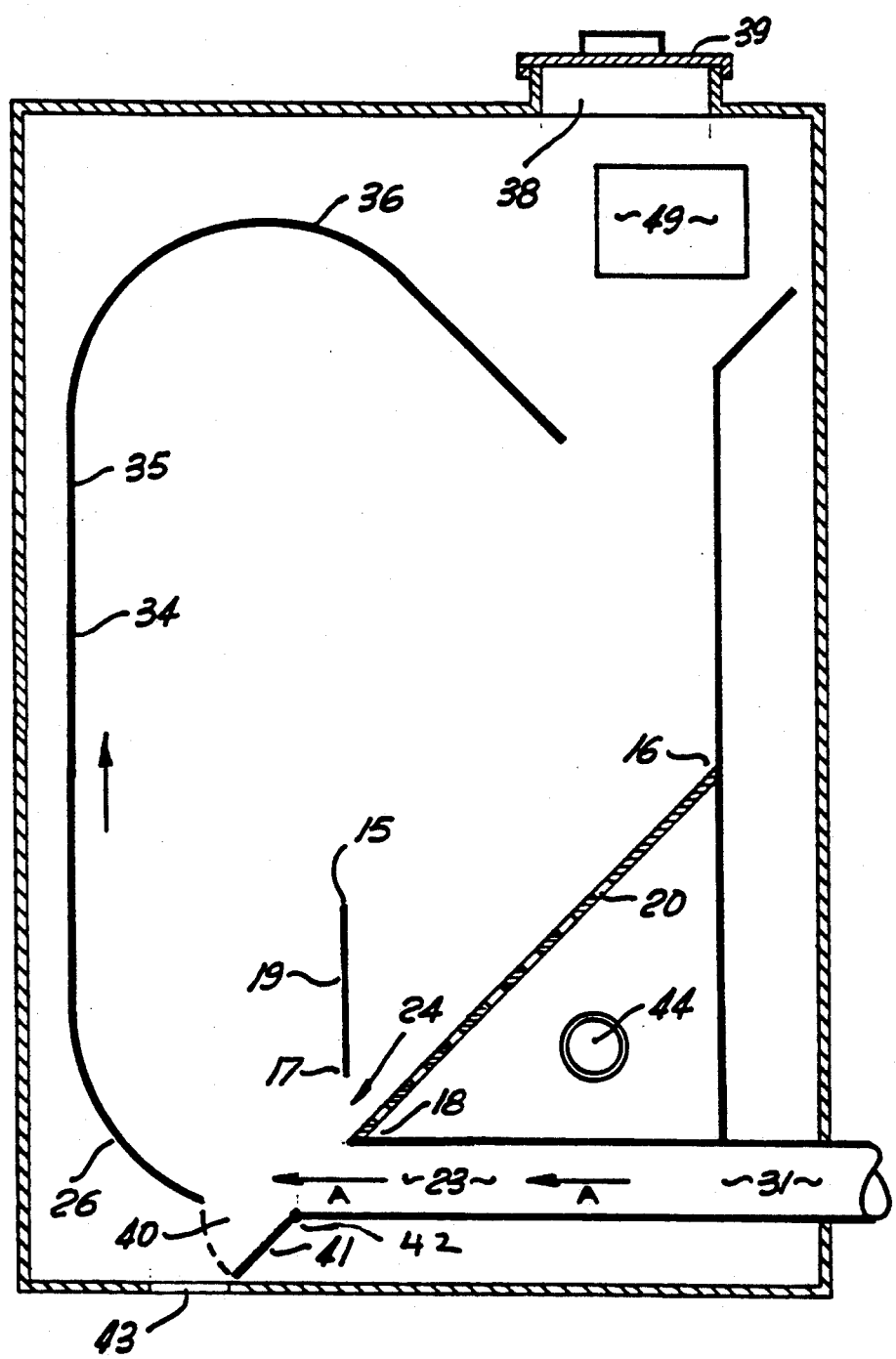
FIG. 3 is a schematic illustration of a second embodiment of the invention.

A less favoured embodiment is illustrated schematically in FIG. 3 wherein parts having the same or similar function as parts of the embodiment shown in FIGS. 1 and 2 are identified by corresponding numerals. In the embodiment of FIG. 3 a charge of beans admitted via loading port 38 is carried down a perforated wall 20 which functions similarly to hopper wall 20 and which may be straight or curved from upper edge 16 to lower edge 18. The beans gravitate towards lower edge 18 where they enter a horizontal stream 23 of roasting air from duct 31. The beans are constrained at the entrance 24 to the air stream by having to pass through a constriction defined between edge 18 to 24 of wall 20 and lower edge 17 of wall 19. In this case entrance 24 is itself the constriction. On passing through the constriction the beans enter the airstream at an acute angle to the direction of flow and with a component of velocity in the flow direction. The beans are carried from the point of entry into the air stream in a curvilinear path defined by wall 26, 35, 36 and are directed back towards wall 20 whereby they are recycled to entrance 24.

Desirably, plate 20 is perforated and air is blown from outlet 44 through the plate. In that case the plate can have a low angle to the horizontal for example an angle of about 10°. Plate 19 need not be perforated and may be at any convenient angle to the horizontal, its purpose being to constrict flow of beans through entrance 24.

Although the invention has herein been described for uses involving roasting, the same apparatus and method may be employed with ambient or cooled air in place of a roasting air stream for cooling particulate matter.

As will be apparent, the features of one embodiment may be combined with those of another. In addition, modifications obvious to those skilled in the art from the teaching herein contained, can be made to the embodiments herin described without departing from the scope of the present invention.

The claims defining the invention are as follows:

1. Apparatus for roasting coffee beans, said apparatus comprising:
   a) a hot air source for providing a stream of roasting air for roasting the beans;
   b) means for containing the beans;
   c) means for admitting the coffee beans from the containing means into the roasting air stream at an air stream entrance;
   d) means for directing the air stream with admitted beans away from the containing means in a generally curvilinear path to an altitude above that of the entrance;
   e) means for directing the beans to return to said entrance;

f) wherein the containing means is a vessel provided with a constriction means for controlling the rate of admission of the beans into the air stream.

2. Apparatus according to claim 1 wherein the means for directing the beans to return to the entrance comprises said vessel being a hopper having an outlet of constricted cross-sectional area in comparison with another cross-sectional area of the hopper and forms said constriction means.

3. Apparatus according to claim 1, said vessel being a hopper, wherein the means for admitting the beans into the roasting air stream includes a hopper throat feeding at an acute angle to the direction of air flow adjacent the entrance.

4. Apparatus according to claim 2 wherein the air stream is directed in said curvilinear path by means of a duct.

5. Apparatus for roasting coffee beans comprising:
a hot air source for providing roasting air for roasting the beans;
a hopper adapted to receive the beans and having an inlet and an outlet;
a curvilinear duct adapted to receive the beans from the hopper outlet and communicating with the hopper inlet; and
means for directing a stream of roasting air from the hot air source into the duct so as to roast the beans and transport the beans through the duct from the hopper outlet to the hopper inlet.

6. Apparatus according to claim 5 further comprising means for admitting roasting air to the hopper.

7. Apparatus according to claim 5 wherein the hopper has a perforated wall through which roasting air is admitted to the hopper.

8. Apparatus according to claim 5 wherein the hopper is defined by side plates disposed in a "V" shape and positioned between a rear plate and a front plate.

9. Apparatus according to claim 5 wherein the hopper includes means for delivering the beans into the duct in a direction intersecting the stream of roasting air.

10. Apparatus according to claim 5 wherein the duct extends in a substantially horizontal direction below the hopper.

11. Apparatus according to claim 5 further comprising means for selectively directing flow from the duct to the hopper inlet or to a roaster exit.

12. Apparatus according to claim 5 wherein a curvilinear hood directs outflow from the duct into the hopper inlet.

13. Apparatus according to claim 5 wherein the hopper has opposite walls and there are baffle means for directing a portion of flow from the duct towards one wall of the hopper and for directing the remainder towards the opposite hopper wall.

14. Apparatus according to claim 5 wherein at least a portion of the duct is defined between a front plate, a rear plate and a duct wall.

15. Apparatus according to claim 14 wherein at least one of the front and rear plates is transparent.

16. A method for roasting coffee beans, said method comprising the steps of:
a) providing a stream of roasting air;
b) admitting the beans from a containing means into the roasting air stream at an air stream entrance location for roasting the beans;
c) directing the flow of the air stream with the admitted beans away from the containing means in a generally curvilinear path to an altitude above that of the entrance location and then allowing the beans to return to the entrance location; and
d) the containing means being a vessel which controls, by means of a constriction, the rate of admission of beans into the air stream.

17. A method according to claim 16 wherein the air flow direction is substantially horizontal in the vicinity of the entrance location.

18. A method according to claim 16 wherein the beans are admitted to the air stream at an acute angle to the direction of air flow.

19. A method according to claim 16 wherein beans are admitted to the air flow at an angle of less than 45° to the direction of air flow.

20. A method according to claim 16 wherein the containing means is a hopper and the constriction is a hopper outlet.

21. A method according to claim 16 wherein the beans are directed towards the air stream entrance location by means of a perforated baffle.

22. A method according to claim 21 wherein hot air is blown through the perforated baffle.

23. A method according to claim 16 further comprising the step of supporting a batch of the beans above the constriction, and controlling the rate of admission of beans into the air stream so that the residence time of the beans in the supported batch is greater than the residence time of beans in transit in the air stream.

24. A method according to claim 23 wherein a second flow of hot air passes through the batch supported above the constriction.

25. A method for roasting coffee beans comprising the steps of:
providing a source of roasting air;
admitting a quantity of beans to a hopper having a hopper inlet and a hopper outlet;
allowing the beans to fall from the hopper outlet into a duct defining a curvilinear path from the hopper outlet to the hopper inlet; and
directing a flow of roasting air into the duct upstream of the hopper outlet to roast the beans and to transport said beans from the hopper outlet via the duct to the hopper inlet, the hopper outlet having a restricted cross-sectional area in comparison with the hopper inlet for controlling the rate of admission of beans into the roasting air.

26. A method according to claim 25 further comprising the step of admitting hot air to the hopper at or adjacent the hopper outlet.

27. A method according to claim 25 wherein the duct extends in a substantially horizontal direction in the vicinity of the hopper outlet.

28. A method according to claim 25 wherein at least a major portion of the beans is circulated from the hopper outlet via the duct to the hopper inlet a number of times.

29. A method according to claim 25 wherein the residence time of the beans in the hopper exceeds the residence time of the beans in the ducts.

30. Apparatus for roasting coffee beans comprising:
a hot air source for providing roasting air for roasting the beans;
a hopper adapted to receive the beans and having an inlet and an outlet;
a curvilinear duct adapted to receive the beans from the hopper outlet and communicating with the hopper inlet; and means for directing a stream of roasting air from the hot air source into the duct so as to roast the beans and transport the beans through the duct from the hopper outlet to an altitude above that of the hopper outlet and then to the hopper inlet, the hopper outlet having a constricted cross-sectional area in comparison with the hopper inlet for controlling the rate of admission of beans into the stream of roasting air.

* * * * *